March 19, 1946.  G. E. DATH  2,396,773
FRICTION SHOCK ABSORBER
Filed April 27, 1944
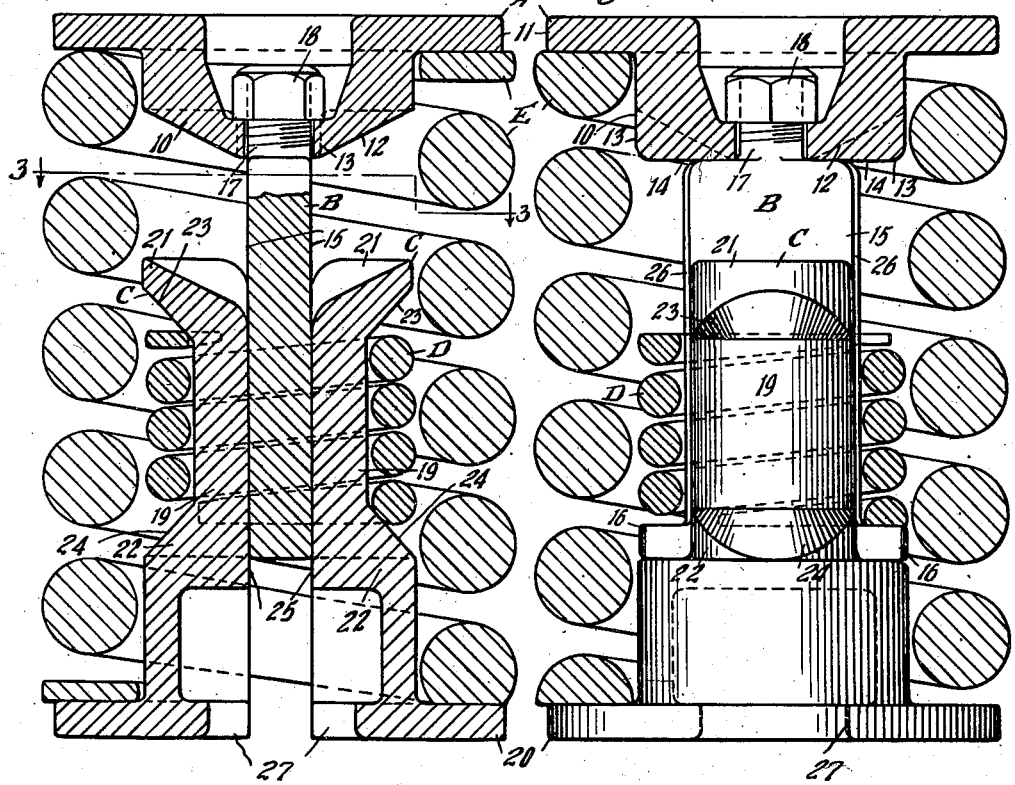
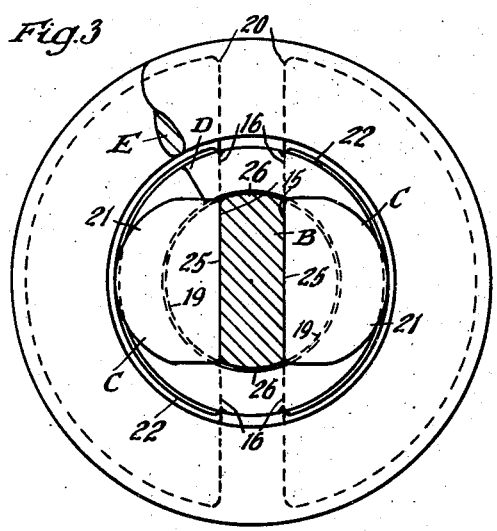
Inventor
George E. Dath
By Henry Fuchs
Atty.

Patented Mar. 19, 1946

2,396,773

UNITED STATES PATENT OFFICE 2,396,773

FRICTION SHOCK ABSORBER

George E. Dath, Chicago, Ill., assignor to W. H. Miner, Inc., Chicago, Ill., a corporation of Delaware Application April 27, 1944, Serial No. 533,012

7 Claims. (Cl. 267—9)

This invention relates to improvements in friction shock absorbers, especially adapted for use with truck springs of railway cars for dampening or snubbing the action of the springs.

One object of the invention is to provide a simple and efficient shock absorber of the character indicated, comprising a friction post, a pair of friction shoes embracing the post and having sliding frictional engagement therewith, an inner coil spring under predetermined compression surrounding the shoes and having direct wedging engagement with wedge faces at opposite ends of the shoes to force the same against the post, and an outer heavy spring surrounding the post and shoes and yieldingly opposing relative lengthwise movement of the same toward each other, wherein the post has shouldered engagement with the outer end of the inner spring to limit relative separation lengthwise of the post and shoes and hold the device assembled.

A more specific object of the invention is to provide a shock absorber as set forth in the preceding paragraph, wherein the post is detachably secured to an end follower and has lugs engaging the outer end of the inner spring to limit relative lengthwise separation of the post and shoes and hold the mechanism assembled.

In the drawing forming a part of this specification, Figure 1 is a transverse, vertical sectional view of my improved shock absorber. Figure 2 is an elevational view of Figure 1, looking from right to left in said figure, showing the inner and outer springs and the follower at the upper end of the device in vertical section. Figure 3 is a horizontal transverse sectional view, corresponding substantially to the line 3—3 of Figure 1.

My improved shock absorber comprises broadly an upper follower A; a friction post B anchored to the follower A; two friction shoes C—C; an inner spring D under initial compression, surrounding the shoes and in wedging engagement therewith; and a heavy outer coil E surrounding the post and shoes and opposing relative lengthwise movement of the post and shoes toward each other.

The upper follower A comprises a heavy, disclike plate having a depending, relatively heavy, central, hollow boss 10, and an annular outer flange 11. The flange 11 serves as an abutment for the upper end of the outer coil spring E. The boss 10 is tapered at the lower end, thus presenting a conical-shaped end portion 12. The boss 10 has diametrically, oppositely projecting, reinforcing webs or wings 13, which present downwardly facing, horizontally disposed, flat abutment faces 14 against which the upper end of the post B is adapted to seat. The webs or wings 13—13 correspond in width to the thickness of the post B and are in registration with the latter. The opening of the hollow boss 10 is of sufficient depth and size to receive the usual spring centering projection of the upper spring follower plate of the truck spring cluster of the railway car, forming a seat for said projection.

The friction post B is in the form of a relatively wide, heavy, flat plate member presenting longitudinally extending flat friction surfaces 15—15 on opposite sides thereof. At the lower end, the post B is provided with a pair of laterally outwardly projecting lugs 16—16 which extend outwardly beyond the side edges of the shoes C—C. At the upper end, the post B is provided with a cylindrical central stem 17, which is threaded to receive a nut 18 to secure the post to the follower A. The post B is rigidly secured to the follower A, being clamped by the nut 18, which is shouldered against the inner end wall of the hollow boss 10. The upper edges of the post bear directly on the flat underneath faces 14—14 of the webs 13—13 of the boss 10.

The two friction shoes C—C are of identical design, each shoe comprising an upstanding, heavy, platelike member 19 which forms the friction shoe proper, having a laterally outwardly projecting base flange 20 at its lower end. The platelike member 19 is laterally outwardly enlarged at its upper and lower ends, as indicated at 21 and 22, the enlargement 22 at the lower end thereof merging with the base flange 20. The outer surface of the plate member 19 of each shoe is transversely rounded or curved, as shown, the curved surfaces of the two shoes C—C being concentric and of the same radius. The enlargements 21 and 22 are provided with inner wedge faces 23 and 24 which are of conical contour. On the inner side each shoe presents a longitudinally extending, flat friction surface 25 which cooperates with the post B. The two shoes C—C embrace the post at opposite sides with the friction surfaces 25—25 thereof respectively engaging the friction surfaces 15—15 of the post. The friction surfaces of the post B and the shoes C—C are of the same width and the opposite side edges of the post are rounded off, or transversely curved, as indicated at 26—26.

The inner spring D, which is in the form of a single helical coil, surrounds the shoes and post in embracing relation with the shoes. This spring is interposed between the enlargements 21 and 22 of the shoes, with its opposite ends bearing on the wedge faces 23 and 24, and is under a predetermined compression. The tendency of the spring to expand presses the end coils thereof against the wedge faces of the shoes, thus forcing the shoes laterally inwardly into tight frictional contact with the friction surfaces 15—15 of the post.

The outer spring E comprises a heavy helical coil, surrounding the shoes C—C and the post B, bearing at its top and bottom ends respectively on the flange 11 of the follower A and the flanges 20—20 of the shoes C—C. The spring E is preferably under initial compression.

My improved shock absorber is substituted for one or more of the spring units of a truck spring cluster, being interposed between the usual top and bottom spring follower plates of said cluster, the flange 11 of the follower A bearing on the top spring follower plate, and the base flanges 20—20 of the shoes bearing on the bottom spring follower plate. As shown in Figure 1, the base portions of the shoes are recessed, as indicated at 27—27, to accommodate the usual spring centering projection of the lower spring follower plate of the spring cluster.

In assembling my improved shock absorber, the spring D is placed around the shoes in compressed condition, by inserting the shoes within the opening of the spring, upwardly through the lower end thereof, in succession. As will be evident, the opening of the spring provides sufficient clearance to permit passage therethrough of the enlarged upper end portion 21 of either shoe after the other shoe is in place. It is immaterial which shoe is first assembled with the spring D, as long as they are applied successively. Assuming that the shoe C at the left of Figure 1 is first applied, the same is passed upwardly through the spring D until the enlargement 21 is disposed at a level above the spring. This shoe is then displaced laterally to the position shown in Figure 1 with the enlargement thereof overhanging the spring. The right hand shoe C is next applied by entering the same through the lower end of the spring D, passing it upwardly through the space provided between the inner side of the shoe first applied and the opposed inner side of the spring, which space is sufficient to permit free passage of the enlargement 21 of the right hand shoe. After the last named shoe has been brought to a position wherein the enlargement 21 is above the upper end of the spring, the shoe is displaced laterally to bring the enlargement into overhanging relation with the end of the spring. The heavy coil spring E is then placed in position around the shoes C—C and seated on the flanges 20—20 thereof. Then the upper follower A is seated on top of the spring E. The post B is next applied by forcing the same upwardly between the two shoes C—C, spreading the latter apart. The mechanism is then compressed to a predetermined extent and the nut 18 secured to the upper end of the post B, thereby fixing the post to the follower A with the lugs 16—16 of the post underlying the bottom end of the spring D. Due to the shoes C—C being spread apart, the spring E is brought into active wedging engagement with the wedge faces 23 and 24 of the shoes, thereby pressing the friction surfaces of the shoes tightly against the friction surfaces of the post. Upon the pressure being removed, the expansive action of the spring E forces the follower A and the post B upwardly, thereby bringing the lugs 16—16 of the latter in shouldered engagement with the bottom end of the spring D.

The operation of my improved shock absorber is as follows: Upon the cluster of springs of the railway car truck being compressed between the spring follower plates of the truck spring cluster, the friction post B and the friction shoes C—C are moved relatively toward each other in lengthwise direction, against the resistance of the spring E. Due to the wedging action between the spring D and the shoes, the required frictional resistance is produced between the post B and the shoes to snub the action of the truck springs. As will be evident, the frictional resistance to relative movement between the post B and the shoes C—C remains constant throughout the compression of the mechanism, the pressure exerted by the spring D being substantially constant during this action.

Upon the spring follower plates of the truck springs being moved apart during recoil of said springs, the expansive action of the spring E restores all of the parts to the normal release position shown in Figure 1. Upward movement of the post B is limited by engagement of the lugs 16—16 thereof with the bottom end of the spring D, thus positively limiting expansion of the mechanism.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction post; of friction shoes embracing the post, said post and shoes being slidable lengthwise with respect to each other; means for wedging the shoes against the post including a coil spring surrounding said shoes and held against lengthwise movement with respect to the shoes; retaining lugs on the post having shouldered engagement with the outer end of said coil spring to limit relative lengthwise separation of the post and shoes and spring means yieldingly opposing relative movement of the post and shoes toward each other.

2. In a friction shock absorber, the combination with an end follower at one end of the mechanism; of a friction post detachably secured to said end follower and projecting inwardly therefrom; friction shoes at the other end of the mechanism embracing said post, said post and shoes being slidable lengthwise with respect to each other; means for pressing said shoes against the post including a coil spring surrounding said shoes and held against lengthwise bodily movement with respect to said shoes; laterally projecting retaining lugs on the inner end portion of said post engaged over the outer end of the spring and shouldered thereagainst to limit outward movement of the post with respect to the shoes and spring means yieldingly resisting relative movement of the post and shoes toward each other.

3. In a friction shock absorber, the combination with an end follower at one end of the mechanism; of an inwardly projecting friction post carried by said follower; friction shoes at the other end of the mechanism embracing said post, said post and shoes being slidable lengthwise with respect to each other; follower flanges on the outer end portions of said shoes; means for wedging said shoes against the post including a coil spring surrounding the shoes and held against bodily displacement lengthwise of the shoes; retaining lugs on the post having shouldered engagement with the outer end of said coil spring to limit relative lengthwise separation of the post and shoes; and a second spring surrounding said post and shoes and bearing at opposite ends on said end follower and the follower flanges of the shoes.

4. In a friction shock absorber, the combination with an end follower at one end of the mechanism; of a friction post detachably secured to said end follower and projecting inwardly therefrom; friction shoes at the other end of the mechanism embracing said post, said post and shoes being slidable lengthwise with respect to each other; follower flanges at the outer ends of said shoes; means for pressing said shoes against the post including a coil spring surrounding said shoes and held against lengthwise bodily movement with respect to said shoes; laterally projecting retaining lugs on the inner end portion of said post engaged over the outer end of the spring and shouldered thereagainst to limit outward movement of the post with respect to the shoes; and a coil spring surrounding said post and shoes and bearing at opposite ends on said end follower and the flanges of the shoes.

5. In a friction shock absorber, the combination with a friction post; of friction shoes embracing the post, said shoes and post being slidable lengthwise with respect to each other, each shoe having wedge faces at opposite ends thereof; a coil spring under predetermined compression embracing said shoes and bearing at opposite ends on the wedge faces at opposite ends of said shoes; retaining lugs at the free end of said post overhanging the outer end of said spring in shouldered engagement therewith to limit outward movement of the post with respect to the shoes; and spring means yieldingly opposing relative movement of the shoes and post towards each other.

6. In a friction shock absorber, the combination with a friction post having longitudinally extending friction surfaces at opposite sides thereof; of an end follower fixed to the outer end of said post; a pair of friction shoes embracing the inner end of the post at the friction surface sides thereof, said shoes having longitudinally extending friction surfaces on their inner sides slidably engaged with the friction surfaces of the post, said shoes having wedge projections at the inner and outer ends thereof, each shoe having a laterally outwardly projecting follower flange at the outer end thereof; a coil spring surrounding said shoes, said spring being interposed between said inner and outer wedge projections of the shoes and held under predetermined compression between said projections; laterally projecting stop lugs on said post at the inner end thereof having shouldered engagement with the outer end of said coil spring; a second spring surrounding said post and shoes and bearing at opposite ends on the end follower and the follower flanges of said shoes and opposing relative lengthwise movement of the shoes and post toward each other.

7. In a friction shock absorber, the combination with follower means at opposite ends of the mechanism, said follower means being movable toward and away from each other lengthwise of the mechanism; of an inwardly projecting post on the follower means at one end of the mechanism; a pair of friction shoes movable in unison with the follower means at the other end of the mechanism, said shoes embracing the inner end of the post at the opposite sides thereof, each shoe having exterior wedge faces at opposite ends thereof; a coil spring under predetermined compression surrounding said shoes and bearing at opposite ends on the wedge faces at opposite ends of the shoes; a lug on said post at the inner end thereof engaging the outer end of said spring to limit outward movement of the post; and a heavy coil spring surrounding said post and shoes and bearing at opposite ends on the follower means at opposite ends of the mechanism.

GEORGE E. DATH.